Feb. 29, 1944.   R. D. PIKE   2,343,081
PRODUCTION OF SODIUM AND POTASSIUM CARBONATES
Filed Feb. 26, 1942
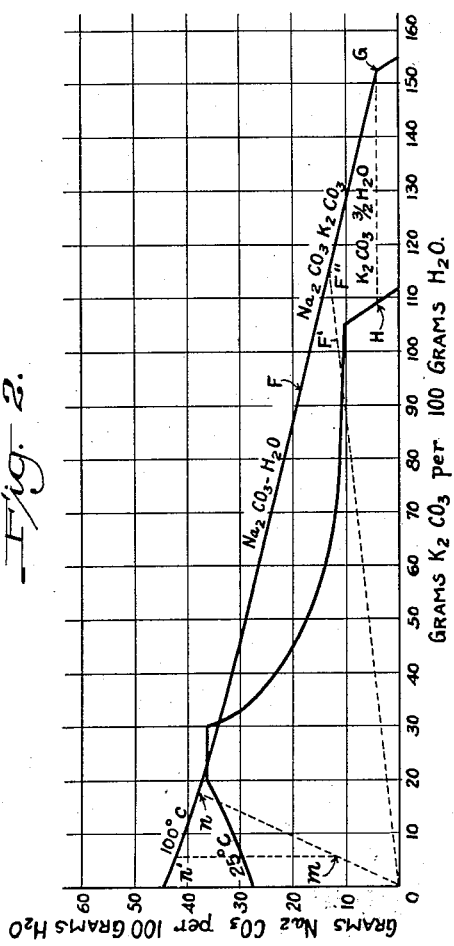
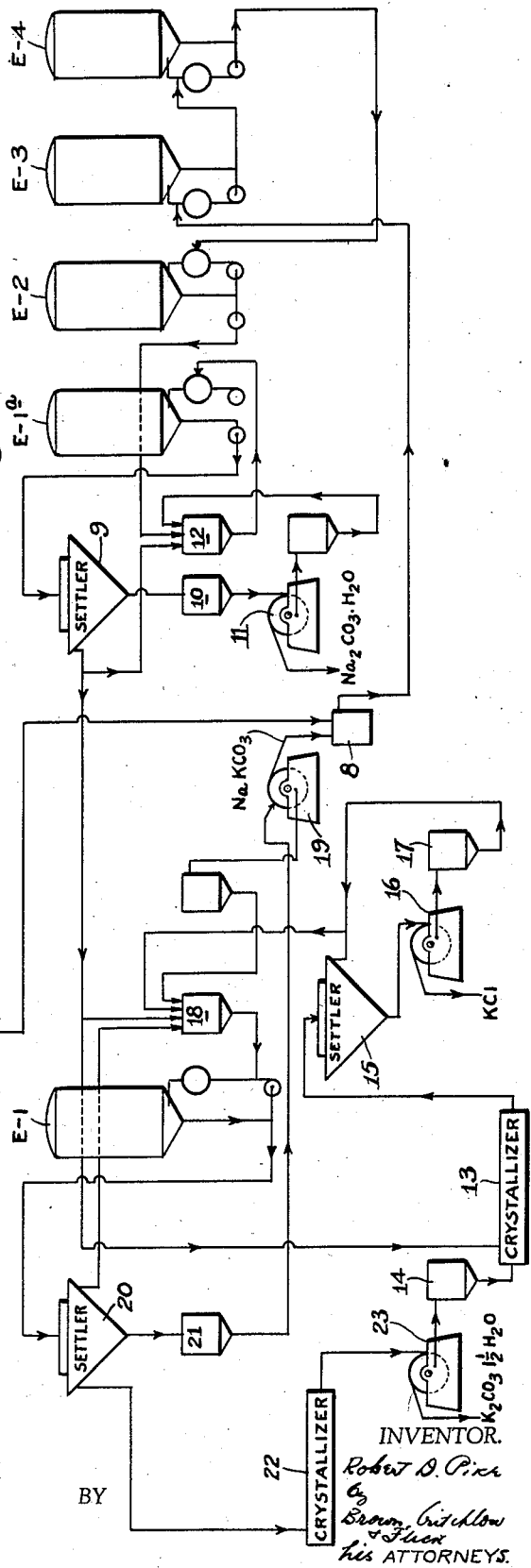
INVENTOR.
Robert D. Pike
BY Brown, Critchlow & Flick
his ATTORNEYS.

performed Feb. 29, 1944

UNITED STATES PATENT OFFICE 2,343,081

PRODUCTION OF SODIUM AND POTASSIUM CARBONATES

Robert D. Pike, Pittsburgh, Pa.

Application February 26, 1942, Serial No. 432,374

3 Claims. (Cl. 23—63)

This invention relates to the production of sodium and potassium carbonates, and this application is a continuation-in-part of my copending application filed April 17, 1941, Serial No. 388,951.

A primary object of the invention is to provide a simple, inexpensive, easily operable and efficient process for producing commercially pure sodium carbonate and potassium carbonate from natural materials such as wyomingite and trona or kindred rocks or minerals.

A further object is to provide such a process in which use is made of trona and potassium silicate base exchange minerals, particularly leucite-containing rocks and especially wyomingite, for producing sodium carbonate monohydrate and potassium carbonate sesquihydrate.

Still another object is to provide a process for producing in substantially pure form the aforesaid hydrated carbonates from the system comprising the reciprocal salt pairs $$Na_2CO_3 + KCl = K_2CO_3 + NaCl$$

and water, in which chlorides may occur in relatively small amounts.

In the State of Wyoming there are extensive deposits of a rock called "wyomingite," a typical analysis of which is as follows:

| | Per cent |
|---|---|
| $K_2O$ | 11.48 |
| $Na_2O$ | 1.32 |
| $SiO_2$ | 51.70 |
| $Al_2O_3$ | 13.05 |
| $Fe_2O_3$ | 4.20 |
| FeO | 1.28 |
| CaO | 6.80 |
| MgO | 7.60 |
| $P_2O_5$ | 2.75 |
| | 100.18 |

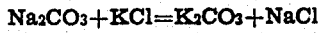

Approximately one-half of wyomingite consists of the mineral leucite ($K_2O.Al_2O_3.4SiO_2$), which is the only potassium silicate mineral known that is amenable to base exchange between its potassium content and sodium ion. Due to this property about 8 pounds of $K_2O$ per 100 pounds of wyomingite are available for base exchange with sodium.

The principal deposit of wyomingite is in Zirkel Mesa, near Superior, Wyoming, about 40 miles easterly from the town of Green River. About 20 miles westerly from Green River are large beds of almost pure trona ($Na_2CO_3.NaHCO_3.2H_2O$), a typical analysis of which is as follows:

| | Per cent |
|---|---|
| $Na_2CO_3$ | 49.29 |
| $NaHCO_3$ | 33.18 |
| $H_2O$ | 17.07 |
| Water insoluble | 0.30 |
| Cl | 0.03 |
| $SO_3$ | Trace |

The invention of my aforesaid copending application is in part predicated upon my discovery that wyomingite or similar rock may be reacted with trona or the like to effect base exchange of the potassium of the wyomingite and produce potassium carbonate which dissolves, as it is formed, in the sodium carbonate liquor provided by the trona, and further that by appropriate treatment it is possible readily to recover therefrom the two carbonates separately and in commercially pure form. Although in the practice of that invention trona may be heated to decompose the sodium bicarbonate present in the rock, and the wyomingite then treated separately with a solution of the resultant sodium carbonate, the application describes it as preferable to effect the decomposition in a suitable reaction vessel which is initially charged with raw trona, wyomingite and water so that the wyomingite base exchange reaction then follows without interruption. For optimum efficiency a considerable excess of sodium carbonate is present because this assists in recovering the maximum amount of the available potassium content of the wyomingite.

The reactions involved are as follows:

Trona decomposition:

$$2Na_2CO_3.NaHCO_3 \rightarrow 3Na_2CO_3H_2O + CO_2$$

Base exchange:

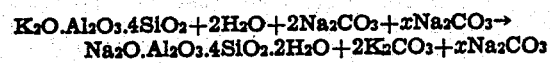

$$K_2O.Al_2O_3.4SiO_2 + 2H_2O + 2Na_2CO_3 + xNa_2CO_3 \rightarrow$$
$$Na_2O.Al_2O_3.4SiO_2.2H_2O + 2K_2CO_3 + xNa_2CO_3$$

where the term $xNa_2CO_3$ refers to the excess of this compound which is used to cause the base exchange reaction to go to completion.

After the base exchange reaction has been completed the solution is separated from insoluble matter, such as wyomingite tails, and is then subjected to concentration by evaporation, preferably in a multiple effect evaporator. In this manner the solution of mixed carbonates may be concentrated to a point where sodium carbonate monohydrate ($Na_2CO_3.H_2O$) will be salted out in substantially pure form. By further concentration there is then crystallized an amount of the mixed, or sodium potassium, carbonate ($NaKCO_3$) up to the point where pure potassium carbonate sesquihydrate ($K_2CO_3.1\frac{1}{2}H_2O$) may be recovered by cooling the mother liquor. The sodium and potassium carbonates are recovered for use, while the sodium potassium carbonate and mother liquor from the potassium carbonate crystallizer are returned to the evaporator feed tank with the most dilute evaporator feed.

I have now discovered that highly desirable results particularly with respect to economy and operation, are to be had by modifications of the process as disclosed in my aforesaid application. The present invention is predicated in part, therefore upon the discovery that it is advantageous to effect certain modifications in and simplifications of the process disclosed in my said application Serial No. 388,951. It is predicated also in part upon treatment of the raw potassium carbonate solution to free it from combined chlorine which enters from the trona and may, if not removed, render the products unsuited for some purposes.

The invention will be described further with reference to the accompanying drawing of which Fig. 1 is a schematic flow sheet of the preferred embodiment of this invention; and Fig. 2 a graph illustrative of the solubility relationships of the system potassium carbonate, sodium carbonate, and water.

In accordance with the present invention the raw trona is preferably calcined, e. g., at 500° to 1000° F., to convert the sodium bicarbonate to sodium carbonate. An aqueous solution of the calcined trona is then prepared and added to a charge of wyomingite, ground to pass a 10-mesh screen, in an autoclave, the solution being used in an amount such as to provide a considerable excess of sodium ions over the amount theoretically required by the foregoing equation. The charge is then heated in the closed autoclave to effect the base exchange reaction, as by heating it for about 3 hours under a steam pressure of 200 pounds. This produces a brine containing sodium carbonate and potassium carbonate (equivalent to about 8 pounds of $K_2O$ per 100 pounds of wyomingite), together with small amounts of chloride and traces of sulfate. The sulfate may be removed from the brine at this point, after separation of insoluble matter, by treatment with a very small amount of barium chloride.

At this stage the brine is not saturated with sodium carbonate and it has now been found to be advantageous to enrich it in sodium carbonate, particularly up to the saturation point of the hot brine, which may be done by adding up to about 9 pounds of sodium carbonate as calcined trona per pound of $K_2O$ recovered in the brine. This sodium carbonate is recovered as the monohydrate, and as the water of the brine must be evaporated in any event its production entails no significant added cost apart from that of calcination of the trona.

Preferably the evaporation is conducted in multiple effect evaporators so arranged that the vapor pressure will increase substantially as the solutions become more concentrated with $K_2CO_3$, which is of assistance in separating the two carbonates. By following this procedure $Na_2CO_3.H_2O$ is salted out first in substantially pure form, and evaporation is carried out almost to the point where $NaKCO_3$ begins to crystallize. All or a part of the mother liquor may then be removed and partly cooled by adding it to the cold circulating mother liquor from the $K_2CO_3.1\frac{1}{2}H_2O$ crystals. This mixed liquor is then passed through a water cooled crystallizer to crystallize out the KCl, which occurs almost completely, thus removing substantially all of the chlorine introduced into the circuit by the trona or otherwise. The KCl is removed thereby so completely, that none can crystallize out with the potassium carbonate sesquihydrate.

The mother liquor from the KCl crystallization is then returned to the last evaporator effect where a quantity of the double salt, $NaKCO_3$, may be salted out down to the point (isothermal invariant point) where $K_2CO_3.1\frac{1}{2}H_2O$ comes out with it. At, or near, this point evaporation is stopped and the solution is cooled, say to about 25° C. to crystallize out the potassium carbonate sesquihydrate in substantially pure form. The mother liquor is returned to the circuit via the KCl crystallizer in the manner just described.

The chloride content of the trona is so low that the KCl crystallization step described may be omitted if it is unimportant that the potassium carbonate carries a small amount of KCl, normally less than 0.5 per cent. In such event the crystallization of $NaKCO_3$ will follow directly that of the sodium carbonate. However, the inclusion of the KCl removal step is usually desirable to produce $K_2CO_3$ of a purity acceptable for most purposes and to provide against a possible larger addition of NaCl to the circuit.

The invention may be described in further detail with reference to the drawing. Having reference to Fig. 1, wyomingite ground to pass a 10-mesh screen is charged from a storage bin 1 into an autoclave 2. Raw trona is calcined in a furnace 3 to convert the $NaHCO_3$ to $Na_2CO_3$, and the product may be stored in a bin 4 from which it is withdrawn according to need into a tank 5 where hot water is added to dissolve it. The solution is then charged into autoclave 2 in an amount as described above. Steam at 200 pounds pressure is applied to the autoclave and the charge is agitated, as by rotating the autoclave, which may be provided interiorly with lifter vanes. Under such conditions the base exchange reaction will usually be completed in about three hours after the charge has reached its full temperature.

After the completion of the base exchange reaction steam may be bled from the autoclave to heat a further charge of water for tank 5, the last 20 pounds, or so, being used to blow down the contents of the autoclave to a filter 6, suitably of the sand type in which the solids form their own filter medium. The cake of insoluble residue, largely sodium leucite with other inert, insoluble material, is discarded as tailings. The clear hot brine, containing sodium and potassium carbonates, together with the wash water is then passed to a tank 7 where additional calcined trona may be added to form the evaporator feed which is passed to an evaporator feed tank 8 where it is made up with the $NaKCO_3$ salted out in the cycle. In some cases the amount of this double salt may be so small and the tolerance of its presence in the sodium carbonate for a particular use may be so great that it need not be recycled as described but may be removed with the sodium carbonate. Although the $NaKCO_3$ is shown as being dissolved in the original evaporator feed, it may be introduced into the evaporator circuit at some other convenient point.

A quadruple effect evaporator is preferably used, with the first effect split, giving five effects in all. In Fig. 1 the split effect is indicated at E—1, E—1a, and the other three effects at E—2, E—3, and E—4, feed from tank 8 enters E—3 and passes to E—4, or vice versa. It passes from there successively to E—2 and E—1a. If sufficient calcined trona has been added in tank 7, sodium carbonate will crystallize out in all four effects, E—4, E—3, E—2 and E—1a, but as illustrated only E—1a is equipped to handle a considerable amount of crystallization. This is done by circulating the liquor from E—1a through a settler 9 from which the underflow goes to a feed tank 10 for the sodium carbonate filter 11. The major part of the overflow from settler 9 is returned to E—1a through a feed tank 12 which also is fed from E—2. Tank 12 receives also the filtrate, or mother liquor from filter 11. In this way crystals of $Na_2CO_3 \cdot H_2O$ are prevented from accumulating in this effect. Of course, if there is a heavy deposition of crystals of sodium carbonate monohydrate in any of effects E—2, E—3 or E—4, as due to heavy addition of trona in tank 7, they should be equipped with a similar circulatory filter system.

The balance of the overflow from settler 9, or the net flow, goes in part to a crystallizer 13 which also receives through a feed tank 14 the cold mother liquor from the crystals of

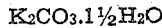

which cools the mixed liquors and salts out the KCl. The flow from crystallizer 13 is to a settler 15 and KCl filter 16. The mother liquor from filter 16 passes to a tank 17 from which it goes to a feed tank 18 for effect E—1. Tank 18 also receives the mother liquor from the $NaKCO_3$ filter 19, a portion of the net overflow from settler 9, and the overflow from settler 15.

Effluent from E—1 passes to a settler 20. The underflow, containing crystals of $NaKCO_3$, goes to filter 19 from which the crystals are returned to feed tank 8. The overflow from settler 20 goes in part to a crystallizer 22 where

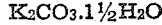

is crystallized for recovery on a filter 23. The major part of overflow from 20 is passed to feed tank 18 for return to E—1.

E—1 and E—1a are supplied with steam at about 30 pounds gauge pressure, although the steam may be supplied at higher or lower pressures. The vapors from E—1 and E—1a are fed to E—2.

The progress of the individual stages of the concentration process involved may be described most simply with reference to Fig. 2. The composition of the raw brine from filter 6 is represented by the point $m$, and calcined trona is dissolved in it along $mn'$. Evaporation begins at $n'$ and proceeds nearly to F in E—1a, E—2, E—3 and E—4, with deposition of sodium carbonate monohydrate. At this point the cycling mother liquor from the potassium carbonate sesquihydrate is added, bringing the liquor to F', when the liquor is treated to crystallize out the KCl. Evaporation is then resumed in E—1 along the line F'F''. The double salt is crystallized out in E—1 along line F''G. Evaporation is stopped at or near G, which is known as an isothermal invariant point, and after separation from the $NaKCO_3$ the solution is cooled to 25° C., producing potassium carbonate sesquihydrate along the line GH. KCl would come out along this line if it had not been removed at F'.

In the production of one ton of $K_2O$ in the form of potassium carbonate sesquicarbonate from the wyomingite and trona of the foregoing analyses there would be charged into the autoclave 4.15 tons of sodium carbonate or its equivalent in calcined trona, 13.9 tons of wyomingite, and 20.8 tons of hot water. If no calcined trona is added to the evaporator feed there will be produced about 3.03 tons of sodium carbonate monohydrate, equivalent to 2.6 tons of soda ash. Up to an additional 9 tons of soda ash may be produced by adding trona to the evaporator feed. In E—1a, E—2, E—3 and E—4 the total evaporation is 27.5 tons of water and in E—1 about 2.5 tons. The amount of double salt circulated is normally about 0.85 ton, but may be less. With the potassium carbonate sesquihydrate mother liquor there is circulated 2.45 tons of water with 2.67 tons of $K_2CO_3$ in solution. In the operation described, the amount of KCl crystallized varies from about 8 pounds when no calcined trona is added to the feed to a maximum of about 25 pounds per ton of $K_2O$ when the feed is saturated with trona.

The use of Wyoming trona is desirable because of the fact that it contains only a trace of sulfate, and also this is preferably removed because any accumulation of $Na_2SO_4$ in the cycle will tend to add it to both the potassium and the sodium carbonates.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. In a method of producing potassium carbonate from wyomingite and crude sodium carbonate which comprises heating in a closed chamber wyomingite, water and said crude carbonate in an amount to supply sodium carbonate in substantial excess of that stoichiometrically needed for base exchange with the available potassium of the wyomingite and thereby producing potassium carbonate, separating the resulting raw brine from solids, dissolving a further amount of sodium carbonate in the raw brine to form an evaporator feed, clarifying said brine, then evaporating said brine to crystallize sodium carbonate until the brine approaches saturation with respect to sodium potassium carbonate, removing and recovering the crystallized sodium carbonate, evaporating the resulting mother liquor further and crystallizing out said sodium potassium carbonate to the point where it and potassium carbonate crystallize together, recovering and returning said sodium potassium carbonate to the evaporator, cooling the sodium potassium mother liquor and crystallizing out potassium carbonate sesquihydrate, recovering said sesquihydrate, and returning the sesquihydrate mother liquor to the brine at the beginning of the step for crystallizing out said sodium potassium carbonate.

2. That method of producing potassium carbonate from wyomingite and crude sodium carbonate containing a minor amount of common salt which comprises heating in a closed chamber wyomingite, water and said crude carbonate in an amount to supply sodium carbonate in substantial excess of that needed stoichiometrically for base exchange with the available potassium of the wyomingite and thereby producing potassium carbonate, separating the resulting brine from solids, dissolving in said brine a further amount of sodium carbonate and then evaporating to crystallize sodium carbonate until the brine approaches saturation with respect to sodium potassium carbonate, removing and recovering the crystallized sodium carbonate, mixing the sodium carbonate mother liquor with sool mother liquor recovered after crystallization of potassium carbonate sesquihydrate, then crystallizing potassium chloride from the resultant mixture, separating and recovering the crystallized potassium chloride, returning the mother liquor from the potassium chloride crystallization to the evaporator and evaporating to crystallize sodium potassium carbonate to the point where it and potassium carbonate sesquihydrate crystallize together, returning the crystallized sodium potassium carbonate to the evaporator, cooling the mother liquor from the sodium potassium carbonate crytallization to crystallize out potassium carbonate sesquihydrate, and removing and recovering said sesquihydrate.

3. The method of producing potassium carbonate from wyomingite and crude sodium carbonate containing a minor amount of common salt which comprises heating in a closed container ground wyomingite, water and said crude carbonate in an amount to supply sodium carbonate in substantial excess of that needed stoichiometrically for base exchange with the available potassium of said wyomingite and thereby producing potassium carbonate, separating the resulting brine from solids, then evaporating said brine to crystallize sodium carbonate until the brine approaches saturation with respect to sodium potassium carbonate, removing and recovering the crystallized sodium carbonate, mixing the mother liquor from the sodium carbonate crystallization with cool mother liquor recovered from potassium carbonate sesquihydrate crystallization, then crystallizing potassium chloride from the resultant mixture, removing and recovering crystallized potassium chloride, returning the mother liquor from said potassium chloride crystallization to the evaporator and evaporating to crystallize sodium potassium carbonate to the point where it and potassium carbonate sesquihydrate crystallize together, returning the crystallized sodium potassium carbonate to the evaporator, cooling the mother liquor from the sodium potassium carbonate crystallization to crystallize out potassium carbonate sesquihydrate, and removing and recovering said sesquihydrate.

ROBERT D. PIKE.